R. McCLURE.
DEMOUNTABLE RIM.
APPLICATION FILED OCT. 12, 1915.
1,216,823.
Patented Feb. 20, 1917.
2 SHEETS—SHEET 1.
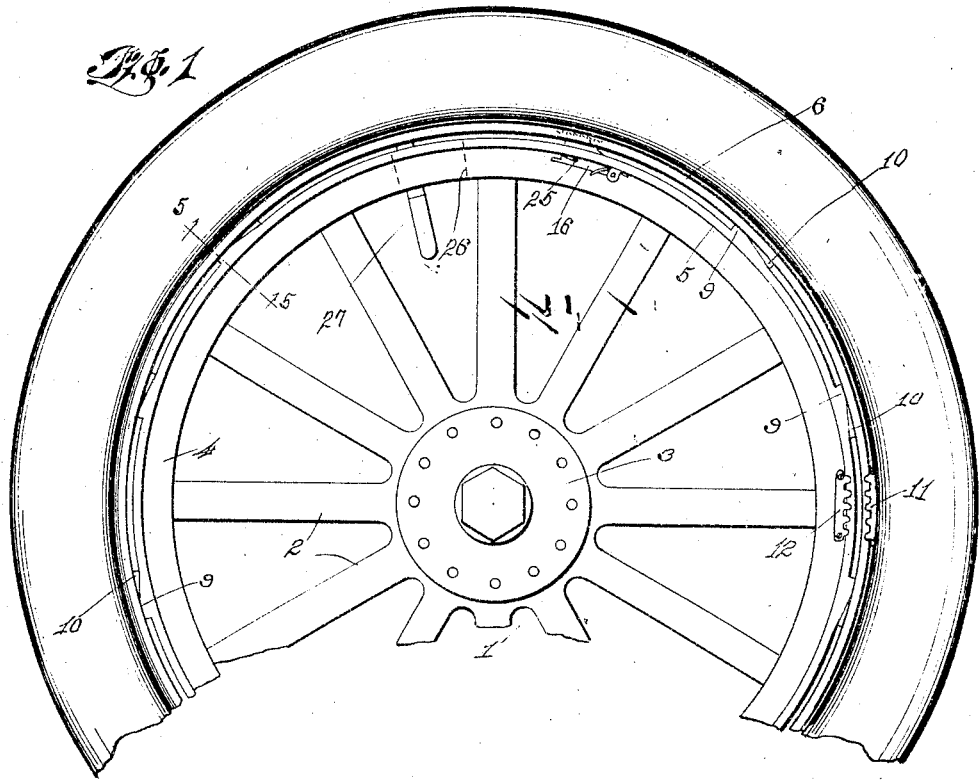
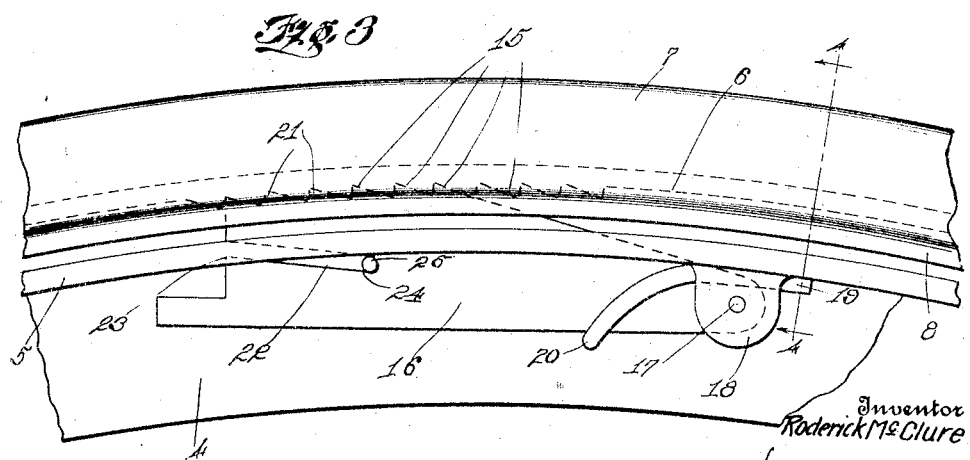
Inventor
Roderick McClure
By Herbert E. Smith
Attorney

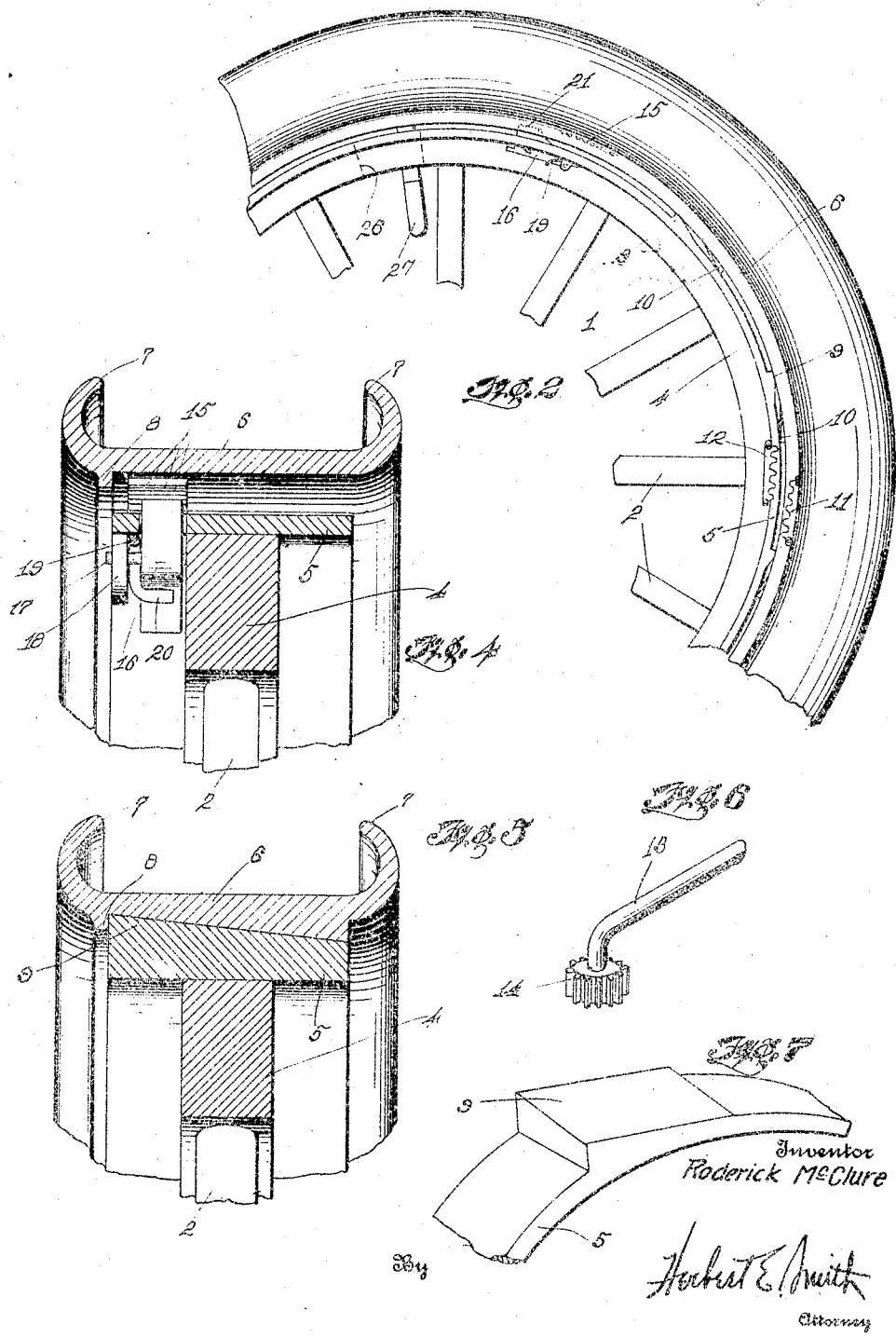

UNITED STATES PATENT OFFICE.

RODERICK McCLURE, OF GILMAN, MONTANA.

DEMOUNTABLE RIM.

1,216,823.  Specification of Letters Patent.  Patented Feb. 20, 1917.

Application filed October 12, 1915. Serial No. 55,417.

*To all whom it may concern:*

Be it known that I, RODERICK McCLURE, a citizen of the United States, residing at Gilman, in the county of Lewis and Clark and State of Montana, have invented certain new and useful Improvements in Demountable Rims, of which the following is a specification.

This invention relates to improvements in demountable rims for vehicle wheels and has to do more particularly with the provision of an improved demountable rim for automobile wheels having pneumatic tires.

It is one of the objects of this invention to provide a vehicle wheel having a wheel rim and a felly rim which are equipped with wedge means of such novel formation that when the rims are circumferentially displaced with respect to each other, to a predetermined extent, they will be securely anchored in locked relation with respect to each other.

A further feature of the invention consists in providing wedge means for the wheel and tire rims which is adapted to not only hold the rims against circumferential relative displacement, but also, against lateral relative displacement.

A further feature of novelty consists in improved locking means for holding the rims against relative circumferential displacement, said locking means having a releasing device which is normally itself held in a fixed position when the locking means is operative, but which may be actuated to release the locking means when it is desired to remove the tire rim from the wheel rim.

A further novel feature of the invention consists in the improved means for imparting relative circumferential displacement to the tire and wheel rims to effect locking engagement between the latter.

The invention has other objects and features which will be more fully described in connection with the accompanying drawings and which will be more particularly pointed out in and by the appended claim.

In the drawings:—

Figure 1 is a view in side elevation of a vehicle wheel, partly broken away, illustrating one form of the device of this invention, with the tire lock shown locked on the wheel.

Fig. 2 is a fragmentary view in side elevation showing the position which the parts would assume when they are assembled and previous to the locking engagement.

Fig. 3 is an enlarged view of my improved locking device.

Fig. 4 is a sectional view on line 4—4 of Fig. 3.

Fig. 5 is a sectional view on line 5—5 of Fig. 1.

Fig. 6 is a perspective view of one element of an improved shifting means for shifting the tire and wheel rims into locking relation.

Fig. 7 is a perspective view of one of the wheel rim wedges.

Like characters of reference designate similar parts throughout the different figures of the drawings.

As illustrated, 1 designates a wheel having spokes 2 radiating from a hub 3, on the outer ends of which spokes a felly 4 is mounted. Secured upon the felly 4 is a wheel rim 5 which is slightly greater in width than the felly 4 and which is shown overhanging the latter, annularly, on both sides thereof.

A demountable tire rim is designated at 6 and may be provided with any suitable form of tire holding flanges 7 in accordance with the requirements of use. Tire rim 6 is provided with a retaining flange 8 adapted for engagement with certain wheel rim wedges, presently to be described, to limit displacement of the tire rim 6 to the right of Fig. 5.

On the periphery of the wheel rim 5, I dispose a plurality of wedge blocks 9 presenting radially outwardly facing wedge surfaces, and said blocks being circumferentially spaced apart from each other as shown in Figs. 1 and 2. Said wedge blocks 9 are shown provided with circumferentially and transversely sloping faces as indicated more particularly in Fig. 7, in other words, the wedge face of each block slopes both circumferentially and transversely of the plane of the wheel. The tire rim 6 is also provided with wedge blocks having radially inwardly facing wedge surfaces, the tire rim blocks being indicated at 10. The slope of the face of each tire rim block will be opposite to the slope of the wedge blocks on the wheel rim so as to coact therewith both as regards transverse and circumferential displacement resisting engagement. The wedge blocks on the tire rim will be equal in number to the blocks on the wheel rim and will be spaced apart the same distance so that when the blocks of said rims are in engagement, as shown in Fig. 1, they will lie in radially super-imposed engagement with respect to each other.

Now it will be seen that the wedge blocks on the wheel rim project radially outwardly from said rim, and in order to mount the tire rim on the wheel rim, the tire rim blocks will first be disposed in staggered relation with the wheel rim blocks so as to shift the tire rim 6 onto the wheel rim 5, to the right of Fig. 5. The retaining flange 8 will arrest lateral movement of the tire rim onto the wheel rim when the said rims attain the position shown in Fig. 5, the said flange 8 engaging the highest portions only of the blocks 9. After the tire rim 6 is in position as shown in Fig. 5, it will then be shifted circumferentially, relative to the wheel rim 5, until the blocks 10 on the tire rim ride upon blocks 9 of the wheel rim. Thus it will be seen, by reference to Fig. 5, that while the retaining flange 8 prevents displacement of the tire rim 6 to the right, the incline of block 9 likewise prevents displacement of the tire rim to the left.

I will next describe improved means for positively causing relative displacement of the wheel and tire rims to lock the same in the position shown in Fig. 1.

On the tire rim I secure a short rack 11 and on the wheel I secure a similar rack 12. The said racks are so disposed that when the blocks 9 and 10 are in wedge relation, the racks will be in opposing relation with respect to each other, but in Fig. 2, it will be seen that the racks are in staggered relation with respect to each other. Now I employ a wrench or tightener which may comprise a crank 13 provided with a pinion 14 which is adapted to mesh with the teeth of the racks 11 and 12. By applying the pinion 14 to the racks 11 and 12, as shown in Fig. 2, rotation of the crank 13 will relatively displace the tire rim until the wedge blocks are in locked relation as shown in Fig. 1.

I will next describe the improved locking means for retaining the tire and wheel rims in locked wedge relation.

Throughout a limited portion of the circumference of one of the rims, preferably the tire rim, I dispose a longitudinal rack of ratchet teeth 15. A ratchet pawl 16 is shown pivoted to the wheel rim at 17, the pivot 17 being journaled in a bracket 18 and in the felly 4, by any suitable means. A spring 19 is suitably fixed on the wheel rim and extends about and against the pawl 16, as indicated at 20, to normally urge the pawl into locked engagement with the rack 15. The pawl 16 is provided with ratchet teeth 21 for engagement with the ratchet teeth 15. It will thus be seen that when the pawl 16 locks the rims against circumferential displacement, then the wedge blocks will not only support the tire rims at suitable annular points against the load imposed upon the wheel, but they will also function to prevent displacement of the wheel rim and tire rim transversely of the plane of the wheel.

Improved means is provided for releasing the pawl 16 from the ratchet rack 15, and as shown, said means includes a slot 22, formed in the pawl 16, at a tangent to the wheel rim 5, in such a manner that the open end 23 will lie within the wheel rim 5 when the pawl 16 is in the position as shown in Fig. 3. However, the closed end 24 of the slot 22 will lie somewhat radially inwardly of the rim 5. A releasing pin 25 is disposed in the slot 22 and when the pawl 16 is in a closed position, the pin 25 will be held in the slot 22 against displacement. When it is desired to release the pawl 16, the pin 25 will be jammed by any suitable instrument, toward the open end 23 of the slot 22, and its cam engagement on the bottom wall of the slot 22 and against the bottom of the rim 25 will serve to wedge the pawl 16 radially inwardly out of engagement with the ratchet teeth 15 so as to release the wheel rim from the tire rim.

A slot 26 provides for insertion of an air valve 27.

It is believed that the novelty and utility of this invention will now be fully understood, and while one specific embodiment thereof has been shown, it is not desired to be limited to the specific form shown except in such limitations as the claim may import.

I claim:—

In a vehicle wheel, wheel and tire rims, means for wedging said rims in anchored relation with respect to each other, a rack on one of said rims, a pawl on the other rim for engagement with said rack, said pawl having a slot therein provided with an open end which is normally closed by one of said rims when said pawl is in a locking position, and means held in said slot by such rim when the pawl is locked for unlocking said pawl, substantially as described.

In testimony whereof I affix my signature in presence of two witnesses.

RODERICK McCLURE.

Witnesses:
 EDNA E. MACK,
 F. M. MACK.